United States Patent [19]

Ogata et al.

[11] 4,002,060

[45] Jan. 11, 1977

[54] PRESSURE MEASUREMENT SHEET AND METHOD OF USING THE SAME

[75] Inventors: Yasuhiro Ogata; Hiroharu Matsukawa, both of Fujimiya, Japan

[73] Assignee: Fuji Photo Film Co., Ltd., Minami-ashigara, Japan

[22] Filed: Oct. 29, 1975

[21] Appl. No.: 627,151

[30] Foreign Application Priority Data

Oct. 29, 1974 Japan .............................. 49-125198

[52] U.S. Cl. .............................................. 73/88 R
[51] Int. Cl.$^2$ .......................................... G01L 1/00
[58] Field of Search ....................... 73/141 R, 88 R; 428/488, 323, 307, 914

[56] References Cited

UNITED STATES PATENTS

| | | | |
|---|---|---|---|
| 3,469,439 | 9/1969 | Roberts et al. ..................... | 73/88 R |
| 3,619,238 | 11/1971 | Kimura ............................. | 117/36.2 |

*Primary Examiner*—Donald O. Woodiel
*Attorney, Agent, or Firm*—Sughrue, Rothwell, Mion, Zinn & Macpeak

[57] ABSTRACT

A pressure measurement sheet comprises a support and a layer containing microcapsules provided thereon, wherein the ratio of the number average wall thickness ($\delta$) to the volume average particle diameter (D) of the microcapsules lies in the range: $\delta/D =$ about $1.5 \times 10^{-3}$ to about $3.0 \times 10^{-2}$. A method of measuring pressure by the use of the pressure measurement sheet described above comprising the steps of contacting the pressure measurement sheet with the area to be measured, applying pressure to form color and determining the applied pressure from changes in optical densities or hues, where the color is formed through contact under pressure between a layer containing microcapsules and a layer containing an adsorbent.

9 Claims, No Drawings

PRESSURE MEASUREMENT SHEET AND METHOD OF USING THE SAME

BACKGROUND OF THE INVENTION

1. Field of the Invention

The present invention relates to a pressure measurement sheet and a method of measuring pressure using the pressure measurement sheet. More specifically, the present invention relates to a pressure measurement sheet comprising microcapsules having a volume average particle diameter and a number average wall thickness in a specified relationship with each other.

2. Description of the Prior Art

Recently, it has become important to physically measure various planar pressures and linear pressures such as the clamping pressure of bolts in machinery, the pressure of automotive brakes, the pressure in molds, mold clamping pressures, bonding pressures between mold walls and a resin in the mold or the molding pressure within a mold in thermoplastic or thermo-setting molding processes, the contacting pressure of springs, the planar clamping pressures of carburetor joints, fuel pipes, fuel tanks, etc., in a fuel system, the pressure generated during collisions between a human body and other objects in an automobile, linear and planar pressures of rubber and plastic rolls, the effective limit and the effectiveness of gasket seals, hydraulic pressure in brakes, the pressure of gear teeth contact, the planar contact pressure between solids, the contact pressure of a cock in a cock valve, the contact pressure between curved surfaces, the contact pressure of rollers used in steel sheet material fabrication, the pressure between the sole of a persons's foot and the floor, the pressure between a human body and a chair or the like. However, methods of easy measurement of the above-described types of pressure are scarce, and most existing methods require complicated operations.

Conventional methods for measuring planar pressures or linear pressures and the like include a strain gauge method which utilizes the relationship between a stress and the strain caused thereby, a load meter method and using pressure-sensitive paint (strain-sensitive lacquer) and the like.

The employment of a strain gauge for the measurement of planar pressure, linear pressure or the like, however, not only requires large scale facilities including amplifiers, detectors, recorders and other devices, but also requires highly skilled operators for the devices and intricate calculations on the strength of material. This method has the further disadvantage that the surface of the materials to be measured must be flat and smooth, due to the inherent nature of the strain gauge. Strain gauges are described in detail by J. Yarnell in *Strain Gauges*, (published by Electronic Engineering Co., Ltd., London, 1957).

Using a pressure-sensitive paint (stress-sensitive lacquer) often results in unevenness in the paint coating, adhesion of the paint is often poor and complicated procedures are required.

The use of a load meter obstructs the miniaturization of the measurement system and, therefore, is not suitable for the measurement of planar or linear pressures.

There is also known a method of using a pressure-sensitive laminate (see U.S. Pat. No. 3,647,504) which is a mono-leaf recording paper comprising microcapsules of different wall thickness containing, respectively, various marking solutions of colors that differ depending on the wall thickness. In this pressure-sensitive laminate, different microcapsules are ruptured with different degrees of applied pressure to release marking solutions of different colors and, therefore, the applied pressure can be determined by checking the densities or hues of the colors released.

According to this method, however, pressure is shown only in an approximate order, and exact pressure values are difficult to determine. Further, in practical use, the pressure-sensitive laminate is defective as significant color staining of hands and clothing, etc., results.

In view of the foregoing, we performed a series of studies on methods of measuring pressure in all types of areas without large scale apparatus, the need for highly skillful operators or complicated calculations and, as a result, reached the method which comprises contacting a recording sheet with an object where pressure is to be measured to develop color under pressure and reading the pressure based on changes in the optical densities or hues of the colored images formed on the recording sheet, where the color formation results from pressurized contact between a microcapsule layer containing a color former and an adsorbent layer (see Japanese Patent Publication 33789/74).

However, a pressure sensitive recording paper or a pressure sensitive copying paper as disclosed in U.S. Pat. Nos. 2,712,507, 2,730,456, 2,730,457, 3,418,250 and 3,425,327 is defective when used as a measurement sheet as the pressure measurement is inaccurate in the range between about 1 kg/cm$^2$ and about 200 kg/cm$^2$. We further continued our studies to overcome these defects and, as the result, discovered a pressure measurement sheet which has an excellent accuracy for pressure measurement in the range of about 1 Kg/cm$^2$ to about 200 Kg/cm$^2$, thereby reaching the present invention.

SUMMARY OF THE INVENTION

It is a first object of the present invention to provide a pressure measurement sheet capable of measuring pressures such as planar pressures, linear pressures, and the like, of materials to be measured without large scale apparatus, highly skilled operators or complicated calculations.

A second object of the present invention is to provide a method of measuring pressures such as planar pressures, linear pressures, and the like, by way of a simple dynamic measurement using a pressure measurement sheet as described above.

A third object of the present invention is to provide a pressure measurement sheet capable of measuring pressures with high accuracy, such as planar pressures, linear pressures, and the like, in the range of about 1 kg/cm$^2$ and about 200 kg/cm$^2$.

A fourth object of the present invention is to provide a pressure measurement sheet capable of measuring with ease the distribution of the pressures such as planar pressures, linear pressures, and the like, in addition to a mere point measurement.

A fifth object of the present invention is to provide a pressure measurement sheet capable of storing the distribution pattern of the pressure measured for a long period of time.

A sixth object of the present invention is to provide a pressure measurement sheet that does not stain hands or clothing and which forms moderate color markings.

These and other objects of the present invention are achieved by the method which comprises the steps of:

preparing a pressure measurement sheet by coating on a support microcapsules whose $\delta/D$ ratio is in the range of about $1.5 \times 10^{-3}$ to about $3 \times 10^{-2}$, D being the volume average particle diameter and $\delta$ being the number average wall thickness of the capsules;

contacting the pressure measurement sheet with the portion of the object where the pressure is to be measured to form color under pressure; and determining the applied pressure based on a change in the optical density or hue of the color image formed on the pressure measurement sheet, wherein color formation is obtained by contact under pressure between a microcapsule layer containing a color former and an adsorbent layer.

DETAILED DESCRIPTION OF PREFERRED EMBODIMENTS OF THE INVENTION

In the present invention, the ratio $\delta/D$ between the volume average particle diameter (D) and the number average wall thickness ($\delta$) is preferably in the range of about $1.5 \times 10^{-3}$ to about $3.0 \times 10^{-2}$, more preferably $2.0 \times 10^{-3}$ to $3.0 \times 10^{-2}$, and most preferably in the range of $2.5 \times 10^{-3}$ to $3.0 \times 10^{-2}$.

If the ratio $\delta/D$ for the microcapsules is greater then the above range, the increase in the color density at color formation is reduced, which lowers the accuracy of the pressure measurement. On the contrary, a ratio lower than the above range impairs the heat resistivity of the microcapsules and reduces their physical strength. Moreover, pinholes are likely to result in the capsule walls to hinder their practical use.

In the method of the present invention, the pressure measurement sheet comprises a microcapsule layer and an adsorbent layer on one side or on opposite sides of the support, or each of these two types of layers can be provided on a separate support.

Processes for forming microcapsules useful for the preparation of the recording sheet of the present invention can be based, for example, on the following methods. Coacervation methods (as disclosed in U.S. Pat. Nos. 2,800,457, 2,800,458, 3,041,289, 3,687,865, etc.), interfacial polymerization methods (as described in U.S. Pat. Nos. 3,492,380 and 3,577,515, and British Pat. Nos. 950,433, 1,046,469, 1,091,141, etc.), internal polymerization methods (as disclosed in British Pat. No. 1,237,498 and French Pat. Nos. 2,060,818, 2,090,862, etc.) and external polymerization methods (as disclosed in British Pat. No. 989,264 and Japanese Patent Publications 12380/62, 14327/62, 29483/70, 7313/71, 30282/71, etc.).

Solvents as are used herein for dissolving the color formers are not particularly restricted in any manner and any conventional solvent can be used in this invention. They include, for example, synthetic aromatic oils such as alkylated naphthalenes, alkylated biphenyls, hydrogenated terphenyls, alkylated diphenylmethanes (having 1 to 4 alkyl groups containing, respectively, about 1 to 5 carbon atoms), petroleum fractions such as kerosene, naphtha, paraffin oil and the like, synthetic aliphatic oils such as chlorinated paraffins, vegetable oils such as cotton seed oil, soybean oil, linseed oil, or mixtures thereof. There are no particular restrictions on the ratio of the color former to solvent, but preferably the weight ratio of color former to solvent is about 0.01 to about 50 wt%, most preferably 0.5 to 25 wt%.

The color formers used in the present invention are colorless compounds which form a color on contacting a solid acid, and they can be defined as electron donating, colorless organic compounds.

The types, nature and the like of the color formers used have no substantial effect on the present invention, and hence any conventional color former can be used. They include, for example, triaryl methane series compounds, diaryl methane series compounds, xanthene series compounds, thiazine series compounds, spiropyran series compounds and the like.

Specific examples of color former compounds include triphenylmethane compounds such as 3,3-bis(p-dimethylaminophenyl)-6-dimethylaminophthalide (referred to as Crystal Violet lactone),
3,3-bis(p-dimethylaminophenyl)phthalide,
3-(p-dimethylaminophenyl)-3-(1,2-dimethylindole-3-yl)phthalide,
3-(p-dimethylaminophenyl)-3-(2-methylindole-3-yl)phthalide,
3-(p-dimethylaminophenyl)-3-(2-phenylindole-3-yl)phthalide,
3,3-bis(1,2-dimethylindole-3-yl)-5-dimethylaminophthalide,
3,3-bis(1,2-dimethylindole-3-yl)-6-dimethylaminophthalide,
3,3-bis(9-ethylcarbazole-3-yl)-5-dimethylaminophthalide,
3,3-bis(2-phenylindole-3-yl)dimethylaminophthalide,
3-p-dimethylaminophenyl-3-(1-methylpyrrole-2-yl)-6-dimethyl-aminophthalide or the like, diphenylmethane series compounds such as 4,4'-bis-dimethylaminobenzhydrin benzylether,
N-halophenylleucoauramine,
N-2,4,5-trichlorophenylleucoauramine and the like, xanthene compounds such as rhodamine-B-anilinolactam,
rhodamine-(p-nitroanilino)lactam,
rhodamine-B-(p-chloroanilino)lactam,
7-dimethylamino-2-methoxyfluoran,
7-diethylamino-2-methoxyfluoran,
7-diethylamino-3-chloro-2-methylfluoran,
7-diethylamino-3-(acetylamino)fluoran,
7-diethylamino-3-(dibenzylamino)fluoran,
7-diethylamino-3-(methylbenzylamino)fluoran,
7-diethylamino-3-(chloroethylmethylamino)fluoran,
7-diethylamino-3-(diethylamino)fluoran or the like, thiazine series compounds such as benzoyl leucomethylene blue,
p-nitrobenzyl leucomethylene blue or the like, spiro series compounds such as 3-methyl-spiro-dinaphthopyran,
3-ethyl-spiro-dinaphthopyran,
3,3'-dichloro-spiro-dinaphthopyran,
3-benzyl-spiro-dinaphthopyran,
3-methyl-naphtho-(3-methoxybenzo)spiropyran,
3-propyl-spiro-dibenzodipyran or the like.

In addition to the electron donating colorless organic compounds set forth above, various pigments as are described in *Pigment Manual New Edition*, pp. 7–49, (edited by Japan Pigment Technology Association, and published by Seibundo Shinkosha, 1st Edition) and those pigments described in *Engineering Handbook for Color Material*, pp. 92–226, (edited by Color Material Association and published by Asakura) can be used as color formers in the present invention.

Representative pigments include, for example, organic pigments such as phthalocyanine blue, phthalocyanine green, benzidine yellow, Hansa Yellow, Lake Red, Carmine 6B and the like, inorganic pigments such as Ultramarine, Berlin blue, carbon black, $Fe_2O_3$, $HgS$, $PbCrO_4$, $PbO$, $TiO_2$, $ZnS$, $BaSO_4$, $CaCO_3$, and the like.

The above mentioned color formers can be freely selected without limitation and can be used alone or as admixtures thereof.

A coating solution containing microcapsules with one or more of the above color formers is thus obtained; while the microcapsules are preferred to have a mono-core structure, those having a composite core structure can also be used in the present invention.

Usually, microcapsules range in size between about 0.1 to about 100 $\mu$, preferably, about 0.5 to 50 $\mu$. In the present invention, microcapsules of about this size can be used.

The coating solution containing the microcapsules is usually in the form of capsule dispersion, preferably with about 5 to about 50 wt% of capsules therein and, therefore, can be coated as such on the support. Alternatively, a binder such as, for example, a latex (styrene-butadiene rubber latex or the like) or water-soluble high molecular weight substance (starch, carboxyethyl cellulose, polyvinyl alcohol, gum arabic, casein, gelatin and the like) can be added to the capsule solution with or without separating the microcapsules from the capsule dispersion, and the system then coated on the support. The amount of binder to capsule is 0 to about 30 wt% in most cases, but this is not limitative.

Further, capsule reinforcing agents such as finely divided cellulose as described in U.S. Pat. No. 2,711,375, finely divided polymers as described in U.S. Pat. No. 3,625,736, finely divided starch as described in British Pat. No. 1,232,347 and microcapsules free of color formers as described in British Pat. No. 1,235,991 can be added to the capsule coating solution or capsule containing layer. Usually up to about 0.5% of each of such materials will be the maximum amount added. Preferably, capsule reinforcing agents are added in or on the capsule layer, i.e., preferably they are not present as a continuous layer but are interspersed in or on the capsule layer.

The coating amount of the capsules preferably ranges, as solids content, between about 0.5 to 17 $g/m^2$ of support, most preferably 2 to 6 $g/m^2$ of support.

The support used is conventional and includes plastic films, metal foils, papers, resin coated papers, synthetic papers and the like. The thickness of the support is preferably about 10 to 350 $\mu$ for easy handling, flexibility, commercial availability and to provide best results, though this thickness range is not mandatory.

The microcapsule layer is coated on at least one side of the support or over or under a layer of the adsorbent to be described hereinafter, or on a surface of a support opposing a separate support carrying the adsorbent layer.

The term adsorbent as is used herein means a solid acid, more specifically, an electron receiving solid acid. Descriptions of adsorbents are found throughout the prior patents referred to above, and specific examples of adsorbents include clays, for example, acidic white clay, active white clay, attapulgite and the like; organic acids, for example, aromatic carboxylic acids such as salicylic acid; aromatic hydroxy compounds such as p-t-butylphenol, p-t-amylphenol, o-chlorophenol, m-chlorophenol, p-chlorophenol, or metal salts thereof (for example, Zn, Mg, Ca, Al, Na, k, etc., salts), mixtures of organic acids and metal compounds (for example, oxides, hydroxides and carbonates of Ca, Mg, Al, Zn, etc.); acidic polymers, for example, phenol-formaldehyde resins, phenol-acetylene resins and the like. Numerous useful adsorbents are disclosed in U.S. Pat. Nos. 3,501,331, 3,669,711, 3,427,180, 3,455,721, 3,516,845, 3,634,121, 3,672,935 and 3,732,120, and in Japanese Patent Publications 48545/70, 49339/70, 93245/70, 92246/70, 93247/70, 94874/70, 109872/70, 112038/70, 112039/70, 112040/70, 112753/70, 112754/70, 118978/70, 118979/70, 86950/71 and the like.

The adsorbents can be coated with a binder on a support, if desired. The supports have been heretofore exemplified. The binders used include those given in the patents and patent publications recited above, for example, styrene-butadiene rubber latexes, styrene-butadiene-acrylonitrile latexes; proteins such as gelatin, gum arabic, albumin, casein and the like; cellulose derivatives such as carboxymethyl cellulose, hydroxyethyl cellulose and the like; water-soluble natural high molecular weight materials such as polysaccharides, for example, agar-agar, sodium alginate, starch, carboxymethyl starch; water-soluble synthetic high molecular weight materials such as polyvinyl alcohol, polyvinyl pyrrolidone, polyacrylic acid, polyacrylamide and the like; high molecular weight materials soluble in organic solvents such as nitrocellulose, ethyl cellulose, polyesters, polyvinyl acetate, polyvinylidene chloride, copolymers of vinyl chloride and vinylidene chloride and the like. These binders can also be used for the capsule dispersion. The proportion of binder to adsorbent is generally 0 to about 0.50 wt%, but this is not limitative. The adsorbents can be present with conventional additives, if desired, for example, UV absorbants, wetting agents, emulsifiers, stabilizers, matting agents, etc.

Referring to the characteristics required of the pressure measurement sheet of the present invention, a correlation between the load pressure and changes in optical density or hue in colored images formed by contact under pressure should first be established (such as, for example, a proportional or inversely proportional relationship, etc.) within the range of pressure to be measured. Measurement errors should be low and the accuracy in the measurement high for the foregoing correlation.

We performed a series of studies, in particular, on the second requirement referred to above and, as the result, found that a pressure measurement sheet providing low measurement error and extremely high measurement accuracy can be obtained for the measurement of pressures such as planar pressures, linear pressures, and the like, in the range of about 1 $kg/cm^2$ to about 200 $kg/cm^2$, by the use of microcapsules where the $\delta/D$ ratio ranges from about $1.5 \times 10^{-3}$ to about $3.0 \times 10^{-2}$, wherein D represents the volume average particle diameter ($\mu$) and $\delta$ is the number average wall thickness ($\mu$) of the microcapsules.

It is contemplated in the present invention that the diameter of various particles and the wall thickness of various particles can vary substantially so long as the volume average particle diameter and number average wall thickness values of the present invention are met. The wall material/color former oil ratio, mechanical stirring conditions at emulsification and amount of emulsifier can be balanced using conventional procedures in the art to freely alter the characteristics of the capsules so as to meet the requirements of the present invention.

In the practice of the present invention, a recording sheet is put between the portions where the pressure is to be applied of the object to be measured, and pressure is applied to the portions, whereby the recording sheet forms color, depending upon the magnitude of the pressure applied. Then, the changes in the optical densities or hues of the color formed are read to thus determine the pressure. The load pressure can be read by means of any conventional instrument such as densitometer, or a calibration curve or plotted lines previously prepared which show the relationship between the densities or hues and the pressure applied can be used.

The method of measuring pressures according to the present invention is advantageous because it is simple and does not require large scale apparatus such as amplifiers, detectors, recorders and the like, as well as not requiring high skilled technicians or complicated calculations as to the strength of materials, as compared with the conventional methods for measuring pressures such as planar pressures, linear pressures, and the like using strain gauges, load meters, pressure-sensitive paints, etc. In addition, since the method of this invention is scarcely affected by the flatness of the surface of a material to be measured, it provides a wider range of selection for the materials to be measured.

Another advantage of the method according to the present invention is that a broad pressure distribution, such as planar pressures, linear pressures, and the like, can be measured, and the pattern of the pressure distribution can be easily stored for long periods of time in the form of a recording sheet, while most other conventional methods for measuring pressure provide only a point-wise measurement.

The pressure measurement sheet of the present invention is further advantageous in that it eliminates the defects of prior pressure sensitive-laminates, such as carbon paper, in staining hands or clothing and producing excess color marking.

Moreover, when the pressure measurement sheet of this invention is used for the measurement of pressures such as planar pressures, linear pressures, or the like, within the range of 1 kg/cm$^2$ to 200 kg/cm$^2$, highly reliable measurement values are obtained with less error and high accuracy. The volume average particle diameter (D) and the number average wall thickness ($\delta$) of the microcapsules used in this specification are determined by the methods described below.

A: Method of measuring the volume average particle diameter of microcapsules

To 100 ml of 1% aqueous solution of sodium hydroxide, a capsule solution is added to a concentration of 10 to 100 ppm (solids content) and the system stirred. Then, a Coulter Counter Model TA, the universal measurement apparatus for particle size distribution (made by Coulter Electronics Co., Hialeah, Florida, U.S.A.), is used for the measurement, the volume average particle diameter (D) being determined in a conventional manner.

B: Measurement of the number average wall thickness of the microcapsules

A microcapsule solution is coated on a PET film base which has been subjected to a conventional corona discharge surface treatment, embedded in epoxy resin, left 1 day and night at 60° C to harden the epoxy resin and cut by a super microtome (Model MT-I made by Portablum Co.) in such a way that the microcapsules are cut into two halves to prepare accurate cross sections for wall thickness determination. A photograph is taken of the micro thin slices thus prepared using a transmission electron microscope, Model HU-12A, (made by Hitachi Ltd.) at about 10,000 to 50,000 X using an acceleration voltage of 100 kv on a photographic film (Fuji Electron Microscope Film, made by Fuji Photo Film Co., Ltd.), and the wall thickness is measured from the photograph and averaged, whereby the number average wall thickness ($\mu$) is reached.

The practical effects of the pressure measurement sheet and the method of pressure measurement according to the present invention are further detailed by way of the following preferred examples which are not to be taken as limiting the present invention in any fashion. All processing were at room temperature, unless otherwise indicated, and all parts, percents and ratios were by weight, unless otherwise indicated.

EXAMPLE 1

5 parts of acid-treated pigskin gelatin and 4 parts of gum arabic were dissolved in 350 parts of water at 40° C and 0.1 part of Turkey red oil as an emulsifier was further added, whereafter 45 parts of color former oil were dispersed therein by emulsification. The color former oil was an oil comprising 4 parts of diisopropylnaphthalene and 1 part of kerosene, and contained 3% Crystal Violet lactone dissolved therein. To this dispersion, water at 40° C was added to make 900 parts of total dispersion and stirring was continued, care being taken so that the liquid temperature was kept below 40° C. Then, 10% acetic acid was added to adjust the pH of the solution to 4.0 to 4.2 to cause coacervation at 20° C. After continuous agitation at 20° C for further 20 minutes, the solution was cooled with ice-water to gel the coacervated film which had deposited around the oil droplets. When the liquid temperature reached 20° C, 7 parts of 37% formaldehyde were added, and when the liquid temperature reached 10° C, 40 parts of the sodium salt of carboxymethyl cellulose was added and then a 15% aqueous solution of sodium hydroxide dropwise added with care to adjust the pH to 9. Heating was then effected for 20 minutes, while stirring, to raise the liquid temperature to 50° C. The temperature was then lowered to 30° C, and 10 parts of cellulose flock (50 to 300 $\mu$) and 20 parts of corn starch (10 to 100 $\mu$) added to thus obtain a coating dispersion containing microcapsules.

By the method as described above, a coating dispersion containing microcapsules having a $\delta$/D ratio (between the number average wall thickness ($\delta$) and the volume average particle diameter (D)) of 9.1 × 10$^{-3}$ was obtained.

The above coating dispersion was coated on a plastic film base (polyethylene terephthalate subjected to a corona discharge treatment) by roll coating to a thickness of 5 g/m$^2$ on a solids basis (the coating amount is expressed in the same manner hereinafter) and dried to obtain pressure measurement sheet (a).

On the other hand, 100 parts of acidic white clay (4 to 80 $\mu$; average 8 $\mu$) treated with sulfuric acid, 20 parts of nitrocellulose and 350 parts of ethyl acetate were compounded in a ball mill for 24 hours to obtain an adsorbent coating dispersion. The coating dispersion was similarly coated on a plastic film base in a coating amount of 6 g/m² to form pressure measurement sheet (b).

The pressure measurement sheets thus obtained were used for measuring the bonding pressure of a gasket located at the juncture between an engine cylinder block and cylinder head, with pressure measurement sheets (a) and (b) being interposed between the gasket and cylinder head with the color former and adsorbent layer face to face to each other, and then contacted under pressure to form color.

To permit correlation of pressure and color, the same pressure measurement sheets as described above were arranged in the same face to face manner and contacted with each other to form color under pressure in the range of 1 kg/cm² to 200 kg/cm² in a stepwise fashion with pressure increments of 2.5 kg/cm². The color markings thus resulted were measured by means of a densitometer and lines plotted which provided the relationship between pressure and color density.

Pressure measurement sheets (a) and (b) disposed between the gasket and the cylinder as described above were removed and the color density of the colored images formed on the pressure measurement sheet (b) (adsorbent coated sheet) measured by means of the above densitometer. The result was compared with the plotted lines to determine the pressure value.

COMPARISON EXAMPLE 1

A strain gauge (made by Baldurin Locomotive Works) was disposed between a gasket and a cylinder head as described in Example 1 as a comparison, and the pressure applied measured. This method of using a strain gauge required large scale apparatus including amplifiers, detectors, recorders, etc., and moreover, since this method provides only a point measurement, the pressure distribution for broad areas between the gasket and the cylinder head that could be measured according to the method of this invention could not be determined.

COMPARISON EXAMPLE 1-2

As a comparison, a coating dispersion containing microcapsules having a ratio of the number average wall thickness to the volume average particle diameter $\delta/D = 3.5 \times 10^{-2}$ was prepared in a manner similar to Example 1. Pressure measurement sheets (a) and (b) were also prepared in the same manner as in Example 1, and they were disposed between the gasket and the cylinder head to measure the pressure applied thereon.

With this comparison method, exact pressure measurements could not be performed, as high errors and low accuracy were encountered.

Table 1 below shows the accuracies in pressure measurement for the pressure range of 1 kg/cm² to 20 kg/cm² using the pressure measurement sheets according to the present invention and the pressure measurement sheets of the comparison example described above.

TABLE 1

| Pressure Measurement Sheet | Accuracy | | | | | |
|---|---|---|---|---|---|---|
| | ±1kg/cm² | ±2.5kg/cm² | ±5kg/cm² | ±7.5kg/cm² | ±10kg/cm² | ±15kg/cm² |
| Present Invention | o | ⊚ | ⊚ | ⊚ | ⊚ | ⊚ |
| Comparison Example 1-2 | x | x | Δ | Δ | o | o |

Symbols in the above table have the meanings below.
⊚ measurable with good accuracy
o measurable, although with some error
Δ considerable error
x unmeasurable It can be seen from the Table that the use of the pressure measurement sheet according to the present invention provides pressure measurement values of much higher accuracy and less error than the sheet of the comparison example.

EXAMPLE 2

3 parts of rhodamine B lactam and 3 parts of 3-diethylamino-7-methylfluoran were dissolved in 35 parts of alkylated (dibutyl, monobutyl and tributyl mixture) diphenylmethane, to which 1 part of the addition product of trimethylolpropane and tolylenediisocyanate (3:1 molar ratio), 0.5 part of the addition product of trimethylolpropane and hexamethylene-diisocyanate and 0.2 part of the addition product of propylene oxide and ethylenediamine were added and dissolved therein. The solution thus prepared was dispersed (emulsified) into a solution comprising 40 parts of water containing 2 parts of carboxymethyl cellulose and 2 parts of polyvinyl alcohol dissolved therein. The temperature during emulsification was 20° C. After the completion of emulsification, 150 parts of water were added and the system heated while stirring to 70° C. Then, the temperature was lowered to 30° C, and at 30° C, 5 parts of cellulose flock and 10 parts of oxidized starch (both as in Example 1) added to obtain a coating dispersion containing microcapsules.

A coating dispersion containing microcapsules having a ratio of the number average wall thickness ($\delta$) to the volume average particle diameter (D): $\delta/D = 5.2 \times 10^{-2}$ was thus obtained.

The coating dispersion of the microcapsules as described above was coated on a paper support with an air knife in an amount of 5 g/m² and dried to obtain a recording sheet.

On the other hand, 50 parts of p-phenylphenol-formaldehyde, 100 parts of butyl acetate and 100 parts of toluene were mixed in a ball mill for 25 hours to obtain an adsorbent coating dispersion. The adsorbent coating dispersion was coated on the above described color former layer in an amount of 6 g/m² and then dried to obtain a single leaf pressure measurement sheet.

The pressure measurement sheet thus prepared was disposed in the juncture of a flange and a valve to measure the pressure distribution and pressure values in the juncture, and the pressure applied to form color.

Another pressure measurement sheet of the same type was used for color formation under pressure (steps of pressure increments each of at 5 kg/cm²) as a control sample.

The pressure measurement sheet disposed in the juncture of the flange and valve was taken out, compared with the comparison sample as described above, and the clamping pressures and distribution thereof measured based on the color density formed.

COMPARISON EXAMPLE 2-1

A load cell utilizing a strain gauge (Model HVH-1000-V, pressure transducer, manufactured by Showa Sokki Co., Ltd.) was disposed in the same manner as in Example 2 in the juncture of a flange and valve for comparison, and the pressure measured. Pressure measurement with a load cell requires expensive instruments. In addition, while theoretical load values per unit area of the juncture can be determined, higher or lower load values that exist in fact, and the pressure distribution, cannot be measured with a load cell.

Thus, it can be seen that the use of the pressure measurement sheet according to the present invention simplifies pressure measurements as compared with a load cell, and can determine not only point pressures but also pressure distribution for a broad area.

COMPARISON EXAMPLE 2-2

A pressure-sensitive laminate was disposed as a comparison sample in the juncture of a flange and valve in the same manner as in Example 2 to measure the pressure. The pressure-sensitive laminate showed remarkable color marking and stained the operators' hands and clothing. In addition, since the pressure-dependency of color changes is less sensitive in the pressure-sensitive laminate, it can show pressure at most in two or three steps, and hence it is a far from exact pressure measurement with high accuracy and low error as can be performed with the pressure measurement sheet according to the present invention.

While the invention has been described in detail and with reference to specific embodiments thereof, it will be apparent to one skilled in the art that various changes and modifications can be made therein without departing from the spirit and scope thereof.

What is claimed is:

1. A pressure measurement sheet comprising a support wherein a layer containing microcapsules containing a color former and a layer containing adsorbent are provided on the same or opposing sides of said support, wherein the ratio of the number average wall thickness ($\delta$) to the volume average particle diameter (D) of the microcapsules lies in the range: $\delta/D$=about $1.5 \times 10^{-3}$ to about $3.0 \times 10^{-2}$.

2. A pressure measurement sheet as defined in claim 1, wherein the $\delta/D$ ratio of the microcapsules lies in the range: $\delta/D = 2.0 \times 10^{-3}$ to $3.0 \times 10^{-2}$.

3. A pressure measurement sheet as defined in claim 1, wherein the $\delta/D$ ratio of the microcapsules lies in the range: $\delta/D = 2.5 \times 10^{-3}$ to $3.0 \times 10^{-2}$.

4. A method of measuring pressure which comprises the steps of contacting a pressure measurement sheet which comprises a layer containing microcapsules containing a color former on a support, wherein the ratio of number average wall thickness ($\delta$) to volume average particle diameter (D) of the microcapsules lies in the range: $\delta/D = $ about $1.5 \times 10^{-3}$ to about $3.0 \times 10^{-2}$, to a measurement site of an object to be measured to form color under pressure, and determining the pressure from changes in optical densities or hues of the colored image produced on the pressure measurement sheet, wherein color image formation results from contact under pressure between the layer containing microcapsules containing a color former and a layer containing an adsorbent.

5. The method of claim 4, wherein said range is $2.0 \times 10^{-3}$ to $3.0 \times 10^{-2}$.

6. The method of claim 4, wherein said range is $2.5 \times 10^{-3}$ to $3.0 \times 10^{-2}$.

7. A pressure measurement sheet comprising a support wherein a layer containing microcapsules containing a color former is provided on said support and a layer containing adsorbent is provided on a different support, wherein the ratio of the number average wall thickness ($\delta$) to the volume average particle diameter (D) of the microcapsules lies in the range: $\delta/D = $ about $1.5 \times 10^{-3}$ to about $3.0 \times 10^{-2}$.

8. A pressure measurement sheet as defined in claim 7, wherein the $\delta/D$ ratio of the microcapsules lies in the range: $\delta/D$=$2.0 \times 10^{-3}$ to $3.0 \times 10^{-2}$.

9. A pressure measurement sheet as defined in claim 7, wherein the $\delta/D$ ratio of the microcapsules lies in the range: $\delta/D$=$2.5 \times 10^{-3}$ to $3.0 \times 10^{-2}$.

* * * * *